United States Patent
Stoll et al.

(10) Patent No.: US 12,321,827 B2
(45) Date of Patent: Jun. 3, 2025

(54) METHOD AND DEVICE FOR TRANSFER LEARNING BETWEEN MODIFIED TASKS

(71) Applicant: Robert Bosch GmbH, Stuttgart (DE)

(72) Inventors: Danny Stoll, Rheinfelden (DE); Diane Wagner, Freiburg (DE); Frank Hutter, Freiburg im Breisgau (DE); Joerg Franke, Freiburg (DE); Simon Selg, Freiburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 973 days.

(21) Appl. No.: 17/394,793

(22) Filed: Aug. 5, 2021

(65) Prior Publication Data
US 2022/0051138 A1    Feb. 17, 2022

(30) Foreign Application Priority Data

Aug. 14, 2020    (DE) ......................... 102020210352.6

(51) Int. Cl.
| | |
|---|---|
| G06N 20/00 | (2019.01) |
| G06F 18/214 | (2023.01) |
| G06N 3/08 | (2023.01) |

(52) U.S. Cl.
CPC ........... G06N 20/00 (2019.01); G06F 18/214 (2023.01); G06N 3/08 (2013.01)

(58) Field of Classification Search
None
See application file for complete search history.

(56) References Cited

U.S. PATENT DOCUMENTS

| | | | |
|---|---|---|---|
| 2019/0095818 A1* | 3/2019 | Varadarajan | G06N 5/022 |
| 2021/0151036 A1* | 5/2021 | Diment | G06N 3/045 |
| 2021/0390466 A1* | 12/2021 | Varadarajan | G06N 5/043 |
| 2022/0027757 A1* | 1/2022 | Phan | G06N 5/01 |

OTHER PUBLICATIONS

James et al. "Algorithms for Hyper-Parameter Optimization", Advances in Neural Information Processing Systems 24 (NIPS 2011)—proceedings.neurips.cc, 2011, ISBN: 9781618395993 (Year: 2011).*

(Continued)

*Primary Examiner* — Xuyang Xia
(74) *Attorney, Agent, or Firm* — NORTON ROSE FULBRIGHT US LLP (57) ABSTRACT

A method for the transfer learning of hyperparameters of a machine learning algorithm. The method includes providing a current search space and a previous search space. A reduced search space is then created and candidate configurations are drawn repeatedly at random from the reduced search space and from the current search space, and the machine learning algorithm, parameterized in each case with the candidate configurations, is applied. A Tree Parzen Estimator (TPE) is then created as a function of the candidate solutions and the results of the machine learning algorithm parameterized with the candidate configurations, and the drawing of further candidate configurations from the current search space using the TPE is repeated multiple times, the TPE being updated upon each drawing.

10 Claims, 7 Drawing Sheets

(56) References Cited

OTHER PUBLICATIONS

Hu, et al.: "Experienced Optimization with Reusable Directional Model for Hyper-Parameter Search", Proceedings of 27th Joint Conf. on Artificial Intelligence (I)CAI-18, (2018), pp. 2276-2282, URL: https://doi.org/10.24963/jcai.2018/315 [accessed on Jun. 18, 2021.
Li, et al.: "Exploiting Reuse in Pipeline-Aware Hyperparameter Tuning", arXiv preprint arXiv:1903.05176, (2019), pp. 1-13. URL:https://arxiv.org/pdf/1903.05176.pdf [accessed on Jun. 18, 2021].
Perrone et al., "Learning Search Spaces for Bayesian Optimization: Another View of Hyperparameter Transfer Learning," 33rd Conference on Neural Information Processing Systems (Neurrips 209), Vancouver, Canada, 2019, pp. 1-11. <http://papers.neurips.cc/paper/9438-learning-search-spaces-for-bayesian-optimization-another-view-of-hyperparameter-transfer-learning.pdf> Downloaded Aug. 3, 2021.
Falkner et al., "BOHB: Robust and Efficient Hyperparameter Optimization at Scale," Cornell University, Proceedings of the 35th International Conference on Machine Learning, Stockholm, Sweden, PMLR 80, 2018, pp. 1-19. <https://arxiv.org/pdf/1807.01774.pdf> Downloaded Aug. 3, 2021.
Bergstra et al., "Algorithms for Hyper-Parameter Optimization," Advances in Neural Information Processing Systems 24 (NIPS 2011), 2011, pp. 1-9. <https://papers.nips.co/paper/4443-algorithms-for-hyper-parameter-optimization.pdf> Downloaded Aug. 3, 2021.

\* cited by examiner

METHOD AND DEVICE FOR TRANSFER LEARNING BETWEEN MODIFIED TASKS

CROSS REFERENCE

The present application claims the benefit under 35 U.S.C. § 119 of German Patent Application No. DE 102020210352.6 filed on Aug. 14, 2020, which is expressly incorporated herein by reference in its entirety.

FIELD

The present invention relates to a method for transfer learning between modified tasks for a machine learning process, as well as a computer program and a machine-readable storage medium.

BACKGROUND INFORMATION

Algorithms for machine learning often require costly hyperparameter optimization (HPO), meaning only then do these algorithms attain their optimal productivity for a given task definition. Unfortunately, each time a developer makes a (small) adjustment of the algorithm or of the search space, for example, the optimal hyperparameter configuration may change, so that it must be reset, because machine learning processes are very sensitive with respect to their hyperparameters. Therefore, it is a common practice to restart the HPO from scratch after the adjustment just mentioned. Since all findings obtained in earlier development steps are not taken into account in the case of the standard HPO, efficiency in terms of reuse of optimizations already carried out is low.

To be sure, there are approaches which use knowledge gained in earlier tasks, but knowledge from earlier development steps is not reused in these approaches, e.g., Perrone, V., Shen, H., Seeger, M. W., Archambeau, C., and Jenatton, R., (2019), "Learning Search Spaces for Bayesian Optimization: Another View of Hyperparameter Transfer Learning," in Advances in Neural Information Processing Systems, pages 12751-12761, available online: http://papers.neurips.cc/paper/9438-learning-search-spaces-for-bayesian-optimization-another-view-of-hyperparameter-transfer-learning.pdf.

SUMMARY

For example, if the search space is expanded, more specifically, by adding new hyperparameters of a machine learning algorithm, the hyperparameter configuration used up to now may be sub-optimal. In contrast, an example embodiment of the present invention may have the advantage that a new optimal configuration is determined with the least possible consumption of computer resources or, given the use of equal computer resources, the optimal hyperparameter configuration for the expanded search space is found more efficiently.

In addition, due to the increased efficiency of an example embodiment of the present invention, energy is saved and therefore $CO_2$ is reduced.

It is also advantageous that the method in accordance with the present invention is likewise applicable if the machine learning algorithm is modified, e.g., by altering a loss function.

In a first aspect, the present invention relates to a computer-implemented method for the transfer learning of hyperparameters of a machine learning algorithm.

Transfer learning may be understood to mean that past learning advancements or learned knowledge is reused. Transfer learning thus means that a learned problem solution of one task is transferred to another comparable situation and by learning, acquired knowledge is applied to similar tasks.

Hyperparameters may be viewed as parameters of a machine learning algorithm which are used to set and control the behavior of the learning algorithm and/or characterize an architecture of the machine learning system to be trained. Examples for hyperparameters are a learning rate or a number of layers of a neural network.

In accordance with an example embodiment of the present invention, the method includes the following steps: Providing a current search space and a previous search space, a loss function to be optimized with the aid of the machine learning algorithm, and a ranking of evaluated hyperparameter configurations of a previous optimization step utilizing the previous search space with respect to the loss function. It should be noted that the current search space may be modified compared to the previous search space, for example, that a number of hyperparameters may have been changed. The previous search space is preferably the immediately preceding search space, which was used for a previous optimization of the hyperparameters. The ranking may be a sorting of the evaluated hyperparameter configurations in terms of their attained performance for the machine learning algorithm of the previous optimization of the hyperparameters. The hyperparameter configurations in each case are a set of values for the hyperparameters. The search spaces are defined in each instance on the basis of predetermined value ranges of the hyperparameters. If there is a multiplicity of hyperparameters, then the search space is multidimensional and bounded by the value ranges. The value range is a discreet/continuous quantity of values between a predetermined start value and target value, e.g., for the learning rate from 0.001 to 0.99.

A reduced search space is then created. The value ranges of the hyperparameters of the reduced search space correspond to the value ranges of the hyperparameters of the current search space, limited as a function of the values of a predeterminable number of the best hyperparameter configurations from the ranking. The predeterminable number amounts preferably to 15% of the hyperparameter configurations of the ranking.

Candidate configurations are then drawn repeatedly at random from the reduced search space and the current search space, and the machine learning algorithm, parameterized in each case with the candidate configurations, is applied to the loss function to be optimized. This applying may be understood to mean that the machine learning algorithm optimizes the loss function by adjusting parameters of the loss function.

The candidate configurations are hyperparameter configurations which are drawn here for test purposes, with the aim of testing whether they improve the performance of the machine learning algorithm compared to the hyperparameter configurations from the ranking. The configurations of the ranking may also have configurations from an earlier development step. The aim of the developer may be to improve the performance over development steps, but other scenarios are conceivable as well, for example, in the case of a development step which purposely reduces the power of the algorithm to be optimized. The goal is to attain the best performance for the current development step.

It should be noted that the loss function may relate to the HPO algorithm. The loss function which the HPO algorithm optimizes includes the execution of the algorithm (machine learning algorithm) to be optimized given certain hyperparameter values. In executing the machine learning algorithm, a further loss function may be optimized. For example, the HPO algorithm optimizes classification precision on preferably a validation data record with respect to the hyperparameters, the learning algorithm, given hyperparameters, optimizing the cross-entropy on preferably a training data record.

Thereupon, a probabilistic estimator is created as a function of the candidate solutions and the result of the machine learning algorithm, parameterized with the candidate configurations, upon application of the machine learning algorithm to the loss function. The probabilistic estimator is preferably a Tree Parzen Estimator (TPE), however, a Gauss process is also conceivable, for example.

The drawing of further candidate configurations from the current search space with the aid of the probabilistic estimator is then repeated multiple times, after the drawing with the aid of the probabilistic estimator, the probabilistic estimator being able to be updated with the results obtained.

A new ranking of the further candidate configurations may then be generated, and preferably with the hyperparameter configurations of the ranking already existing.

It is possible that the optimal hyperparameter configuration of the hyperparameters which has best optimized the loss function is determined from the ranking. Alternatively, the optimal hyperparameter configuration may be determined with the aid of the probabilistic estimator.

TPE utilizes kernel density estimators to model the densities $l(x)$ and $g(x)$, where $l(x)$ calculates a probability that hyperparameter configuration x is worse or better ($g(x)$) than the best hyperparameter configuration x* found till now, particularly as a function of the previous candidate configurations evaluated via the loss function.

An advantage of creating the probabilistic estimator as a function of candidate configurations from the entire search space and the reduced search space is that it learns implicitly which configurations have functioned well previously. The transfer learning is thereby made possible.

In accordance with an example embodiment of the present invention, it is provided that in creating the reduced search space, the best hyperparameter configurations be selected from the ranking and all values of the hyperparameters of the best hyperparameter configurations be determined, and that a reduced search space be created based on the current search space, the value ranges of the hyperparameters being defined as a function of the minimum and maximum values of the individual hyperparameters of the best hyperparameter configurations.

In addition, in accordance with an example embodiment of the present invention, it is provided that an equal number of candidate configurations be drawn randomly from the reduced and from the current search space. The advantage in doing so is that the method is not stuck in a sub-optimal area, because each time a candidate configuration is drawn randomly, it is decided randomly from which of the two search spaces the candidate configuration is drawn. However, it is also possible that more candidate configurations are drawn from one of the two search spaces than from the other search space. Thus, it is possible to control on which search space the focus of the hyperparameter configurations should be placed.

Furthermore, in accordance with an example embodiment of the present invention, it is provided that the step of the repeated random drawing of candidate configurations from the reduced and from the current search space be carried out at least two times the number of hyperparameters of the current search space. The advantage here is that the TPE is created expeditiously with a minimum number of randomly drawn candidates and nevertheless delivers reliable results, for owing to the kernel density estimators, a minimum number is needed to as best as possible resolve the trade-off between number of configurations used versus accuracy of the TPE.

Moreover, in accordance with an example embodiment of the present invention, it is provided that at least one of the hyperparameters be categorical, in reducing the search space, the value range of the categorical hyperparameter likewise being limited to the minimum and maximum value of the category which was used for the best hyperparameter configurations. To be more precise, the value range is limited to the utilized values of the categorical hyperparameter of the best hyperparameters. In this connection, if the search space is {A, B, C, D}, for example, and the best configurations of the ranking have the values A or B, then the limited search space is {A, B}.

In accordance with an example embodiment of the present invention, it is further provided that the method be carried out repeatedly in succession, the number of the best configurations being reduced by a predefinable value with each implementation of the method.

In a second aspect of the present invention, it is provided that the machine learning algorithms be used to train a neural network.

It is further provided that the trained deep neural network determine an output variable as a function of an acquired sensor variable of a sensor, the output variable than being able to be used to determine a controlled variable with the aid of a control unit.

The controlled variable may be used to control an actuator of a technical system. For example, the technical system may be an at least semi-autonomous machine, an at least semi-autonomous vehicle, a robot, a tool, a factory machine or a flying object such as a drone. For instance, the input variable may be determined as a function of acquired sensor data and provided to the machine learning system. The sensor data may be acquired from a sensor such as a camera of the technical system or alternatively, may be received from outside.

In further aspects, the present invention relates to a computer program which is created to carry out the methods above, and a machine-readable storage medium on which this computer program is stored.

In the following, specific embodiments of the present invention are explained in greater detail with reference to the figures.

DETAILED DESCRIPTION OF EXAMPLE EMBODIMENTS

Figure 1:
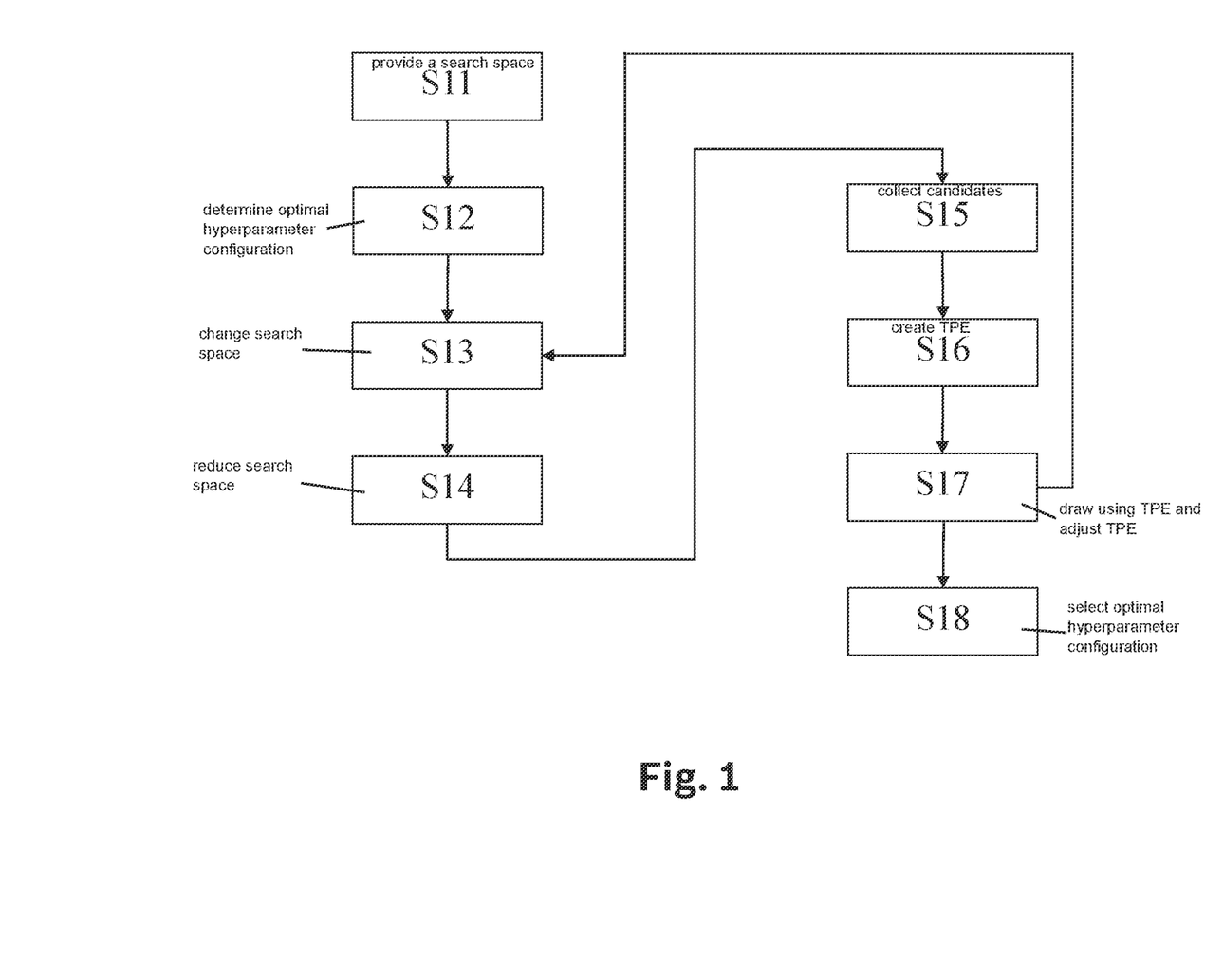
FIG. 1 shows schematically a flowchart of one specific embodiment of the present invention.

FIG. 1 shows schematically a flowchart of a method of one specific example embodiment of the present invention.

In this specific embodiment, it is explained by way of example how the invention may be used for a machine learning algorithm with various hyperparameters. Hyperparameters may be: Learning rate, number of neurons of a layer, number of layers, batch size. In addition, a categorical hyperparameter may also be provided, e.g., a Boolean variable, which characterizes whether augmented training data are used. The machine learning algorithm may be a gradient descent method in order to optimize weights of a neural network with respect to a loss function.

The method begins with step S11. This step includes providing a search space X by specifying value ranges of the hyperparameters. For example, the value range of the learning rate may be specified so that it extends from 0.0001 to 0.99. Loss function $f$ of the machine learning algorithm may be specified in step S11.

Step S12 then follows. This step may be referred to as a first run. Here, an optimal hyperparameter configuration is determined from the search space with the aid of BOHB [Bayesian Optimization Hyperband], for example. Alternatively, methods other than BOHB may also be used, or various hyperparameter configurations may be tried out manually, listed in a ranking, and then the best may be taken over from this ranking. Alternatively, the selected hyperparameter configuration of BOHB may be entered into the ranking. For more information concerning BOHB: see the paper "Robust and Efficient Hyperparameter Optimization at Scale" by S Falkner, A Klein, F Hutter—arXiv preprint arXiv:1807.01774, 2018, available online: https://arxiv.org/pdf/1807.01774.pdf.

Step S13 then follows. This step may be referred to as a change of search space X by a developer. Here, search space X is changed, for example, by adding a new hyperparameter or removing a hyperparameter, denoted hereinafter as changed search space $X_i$. As a result, the optimal hyperparameter configuration from step S12 may no longer be suitable.

Step S14 then follows. This step may be referred to as reducing the search space. After the search space has been changed in step S13, the top-$\alpha$ hyperparameter configurations are selected from the ranking from step S12. It should be noted that $\alpha$ is a predetermined value, e.g., 15%. Changed search space $X_i$ is thereupon altered, particularly reduced, by altering the value ranges as a function of the top-$\alpha$ hyperparameter configurations. For this, the minimum and maximum values of the respective hyperparameters are selected for the top-$\alpha$ hyperparameter configurations and used as new limits of the value ranges of the respective hyperparameters. As a result, a reduced search space $X_i^\sim$ is available. In the event that a categorical hyperparameter is present, the value range may be limited to the values of the top-$\alpha$ configurations of the ranking.

Step S15 then follows. This step may be referred to as collecting of candidates, because candidate configurations are then drawn repeatedly at random from reduced search space $X_i^\sim$ and search space X. The machine learning algorithm is thereupon run with these candidate configurations, and the candidate configurations together with the optimal value of the loss function, which was attained with the aid of the machine learning algorithm with the respective candidate configurations, are stored in a list. Preferably, the drawing is carried out with equal frequency, that is, with the same probability from both search spaces.

Step S16 then follows. This step may be referred to as creation of a TPE. After step S15 has ended, a TPE is created with the aid of the list. For more details concerning the creation of the TPE, reference is made to the document for BOHB cited above, section 3.1 Baysian Optimization, as well as to: Bergstra et al "Algorithms for Hyper-Parameter Optimization," available online: https://papers.nips.cc/paper/4443-algorithms-for-hyper-parameter-optimization.pdf. TPE uses kernel density estimators to model densities $l(x)$ and $g(x)$ for the probability that a given hyperparameter configuration x is worse (l) or better (g) than the best hyperparameter configuration x* already evaluated. The ratio $g(x)/l(x)$ is then used to decide which configuration should be evaluated next, see step S17.

Step S17 then follows. This step may be referred to as drawing with the aid of the TPE and adjusting the TPE. In step S17, further candidate configurations are drawn from search space $X_i$ with the aid of the TPE. This is carried out as a function of the ratio $g(x)/l(x)$. The candidate configurations drawn are then evaluated again by using the machine learning algorithm with these candidate configurations. Depending on the result achieved by the learning algorithm with the respective candidate configurations, the TPE may then be updated, specifically, the results may be entered into the list which is used to update the TPE. After that, a ranking of the candidate configurations with these candidate configurations is generated in terms of optimal values of the loss function discovered with these configurations.

Step S18 then follows. This step may be referred to as selecting the optimal hyperparameter configuration. The optimal hyperparameter configuration may then be taken from the ranking from step S17. Alternatively, it may be selected with the aid of the TPE. The machine learning algorithm may thereupon be run with this hyperparameter configuration, or if the result for it was already stored in S17, it may be reused.

If the developer changes the search space again or even modifies the machine learning algorithm, steps S13 to S17 and S18, respectively, may be carried out again.

Preferably, the learning algorithm with the hyperparameter configuration from step S18 for machine learning is utilized to train a machine learning system, particularly a neural network that is used, e.g., for computer vision. Thus, for object detection or object localization or semantic segmentation, for example.

This machine learning system may be utilized as follows:

At preferably regular time intervals, an environment is detected with the aid of a sensor, particularly an imaging sensor such as a video sensor, which may also be provided by a plurality of sensors, e.g., a stereo camera. Other imaging sensors such as radar, ultrasound or lidar are also conceivable. A thermal imaging camera is imaginable, as well. Sensor signal S of the sensor—or rather, one sensor signal S each in the case of several sensors—is transmitted to a control system. The control system thus receives a sequence of sensor signals S. From them, the control system determines control signals A, which are transmitted to an actuator.

The control system receives the sequence of sensor signals S of the sensor in an optional receiving unit, which converts the sequence of sensor signals S into a sequence of input images (alternatively, sensor signal S may in each case also be taken over directly as input image). For example, the input image may be a section of, or a further processing of, sensor signal S. Input image x includes individual frames of a video recording. In other words, the input image is determined as a function of sensor signal S. The sequence of input images is supplied to a machine learning system—to an artificial neural network in the exemplary embodiment.

The artificial neural network determines output quantities from the input images. In particular, these output quantities may include a classification and/or semantic segmentation of the input images. Output quantities are fed to an optional conversion unit, which from them, determines control signals A that are supplied to the actuator in order to drive the actuator accordingly. Output quantity y includes information about objects which the sensor has detected.

The actuator receives control signals A, is driven accordingly and carries out a corresponding action.

Figure 2:
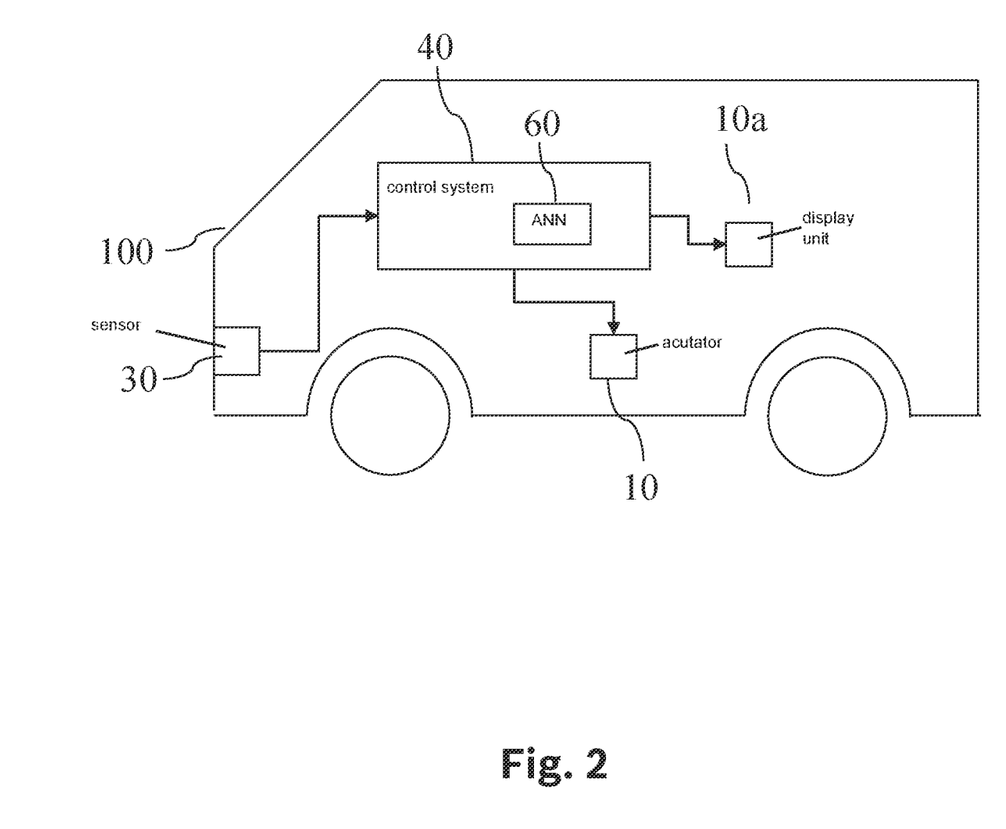
FIG. 2 shows schematically an exemplary embodiment for the control of an at least semi-autonomous robot, in accordance with the present invention.

FIG. 2 shows how control system 40 may be used to control an at least semi-autonomous robot, here an at least semi-autonomous motor vehicle 100.

For example, sensor 30 may be a video sensor disposed preferably in motor vehicle 100.

Artificial neural network 60 is set up to reliably identify objects from input images x.

For example, actuator 10 disposed preferably in motor vehicle 100 may be a brake, a drive or a steering system of motor vehicle 100. Control signal A may then be ascertained in such a way that actuator or actuators 10 is/are controlled in a manner that, for example, motor vehicle 100 prevents a collision with the objects identified reliably by artificial neural network 60, especially if they are objects of certain classes, e.g., pedestrians.

Alternatively, the at least semi-autonomous robot may also be another mobile robot (not shown), for example, one which moves by flying, swimming, submerging or stepping. For instance, the mobile robot may also be an at least semi-autonomous lawn mower or an at least semi-autonomous cleaning robot. In these cases, as well, control signal A may be determined in a manner that the drive and/or steering of the mobile robot is controlled in such a way that the at least semi-autonomous robot prevents a collision with objects identified by artificial neural network 60, for example.

In further preferred specific embodiments, control system 40 includes one or more processors 45 and at least one machine-readable storage medium on which instructions are stored which, when executed in processors 45, then prompt control system 40 to carry out the method according to the present invention.

In alternative specific embodiments, as an alternative or in addition to actuator 10, a display unit 10a is provided.

Alternatively or additionally, display unit 10a may be controlled by control signal A and, e.g., the ascertained safe areas may be displayed. For instance, in the case of a motor vehicle 100 without automated steering, it is also possible for display unit 10a to be controlled by control signal A in such a way that it outputs a visual or acoustic warning signal if it is determined that motor vehicle 100 is in danger of colliding with one of the reliably identified objects.

Figure 3:
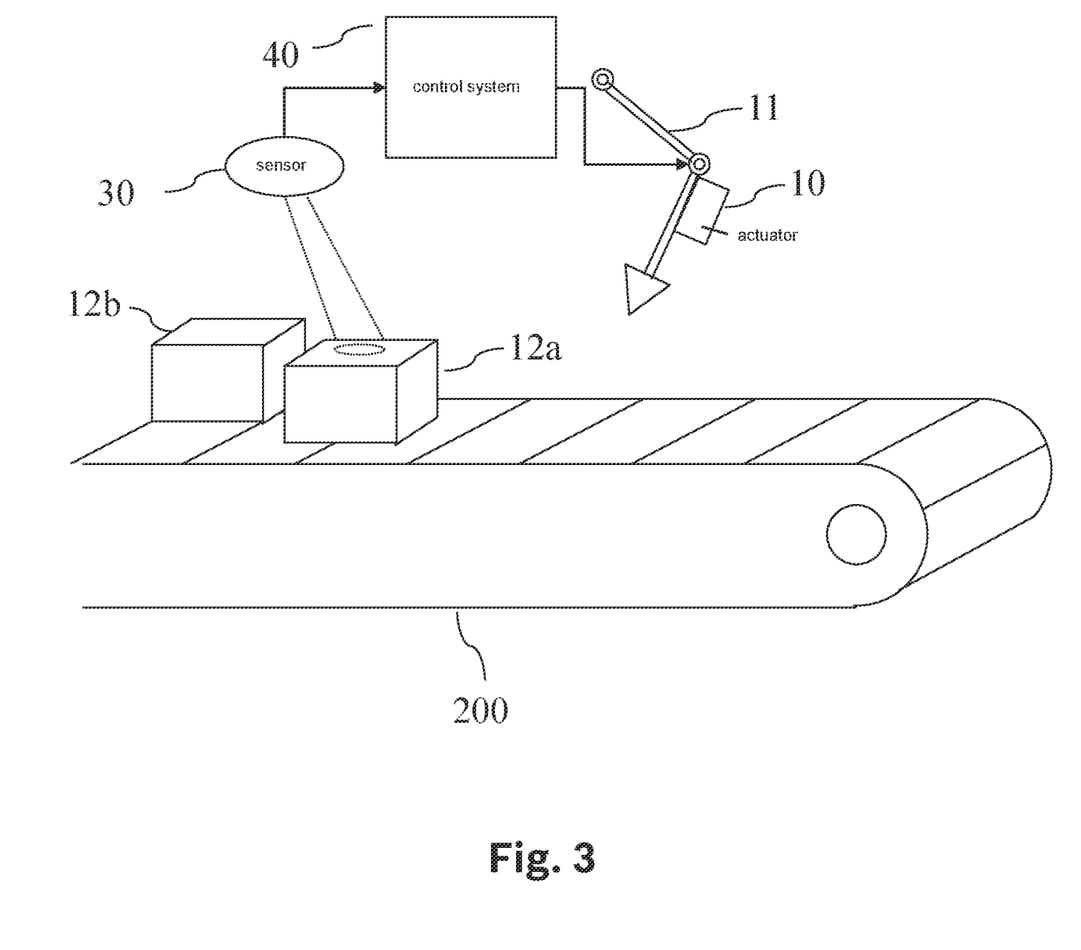
FIG. 3 shows schematically an exemplary embodiment for the control of a manufacturing system, in accordance with the present invention.

FIG. 3 shows an exemplary embodiment in which control system 40 is used to control a manufacturing machine 11 of a manufacturing system 200, by driving an actuator 10 controlling this manufacturing machine 11. For example, manufacturing machine 11 may be a machine for punching, sawing, drilling and/or cutting.

As an example, sensor 30 may then be an optical sensor which, e.g., detects properties of manufacturing articles 12a, 12b. It is possible that these manufacturing articles 12a, 12b are movable. It is possible that actuator 10 controlling manufacturing machine 11 is driven as a function of an assignment of detected manufacturing articles 12a, 12b, so that manufacturing machine 11 executes a following processing step on the correct manufacturing article 12a, 12b accordingly. It is also possible that by identification of the correct properties of the same one of manufacturing articles 12a, 12b (that is, without an incorrect assignment), manufacturing machine 11 adjusts the same manufacturing step for processing a following manufacturing article, accordingly.

Figure 4:
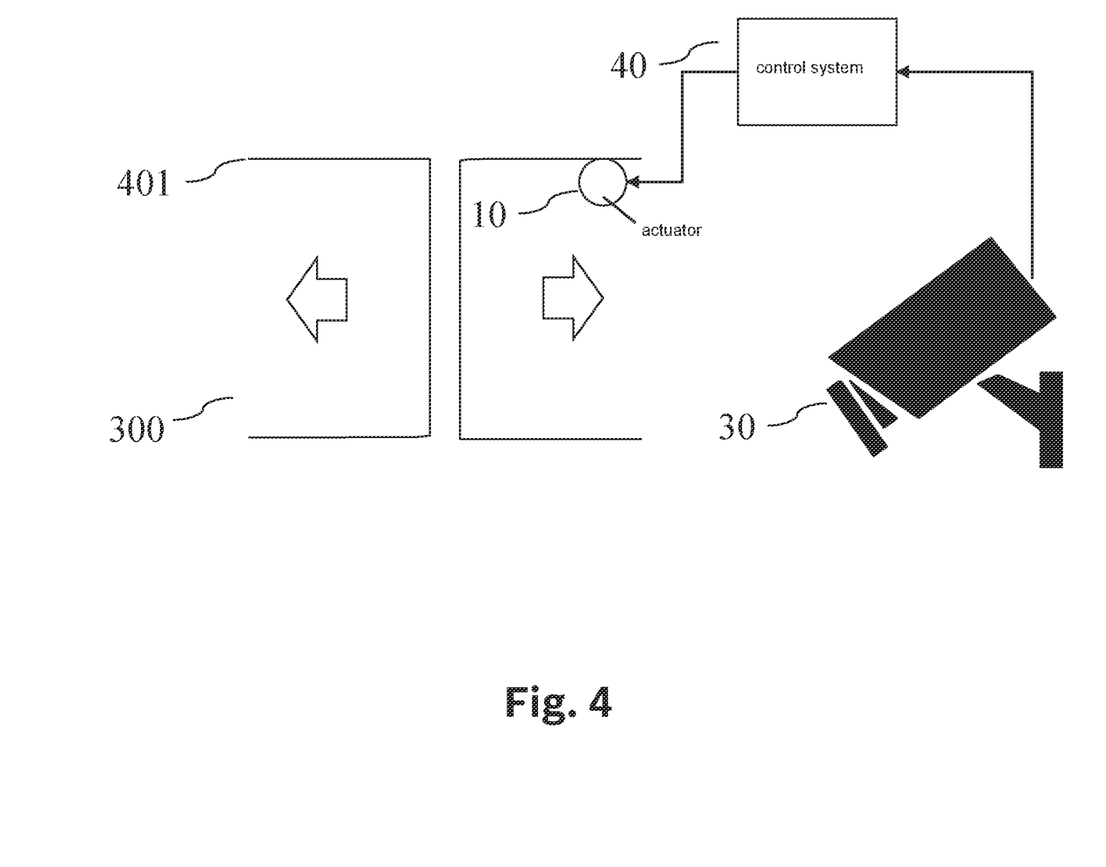
FIG. 4 shows schematically an exemplary embodiment for the control of an access system, in accordance with the present invention.

FIG. 4 shows an exemplary embodiment in which control system 40 is used to control an access system 300. Access system 300 may include a physical access control, e.g., a door 401. Video sensor 30 is set up to detect a person. This acquired image is able to be interpreted with the aid of object-identification system 60. If several people are detected simultaneously, by assigning the people (thus, the objects) to each other, for example, the identity of the people may be determined particularly reliably, e.g., by analyzing their movements. Actuator 10 may be a lock which does or does not release the access control, for example, does or does not open door 401, depending on control signal A. To that end, control signal A may be selected as a function of the interpretation of object-identification system 60, e.g., depending on the ascertained identity of the person. Instead of the physical access control, a logical access control may also be provided.

Figure 5:
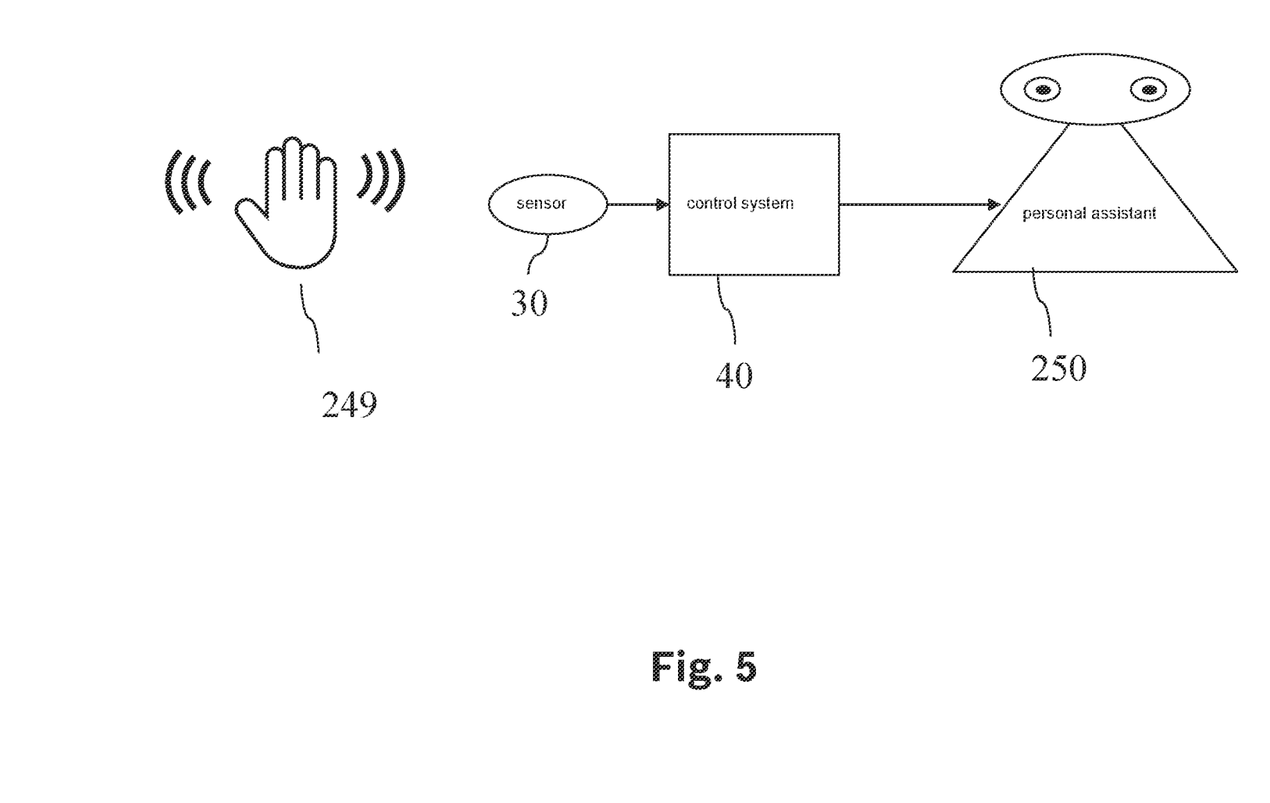
FIG. 5 shows schematically an exemplary embodiment for the control of a personal assistant, in accordance with the present invention.

FIG. 5 shows an exemplary embodiment in which control system 40 is used to control a personal assistant 250. Sensor 30 is preferably an optical sensor, which receives images of a gesture of a user 249.

Depending on the signals of sensor 30, control system 40 determines a control signal A of personal assistant 250, for example, by the neural network carrying out a gesture recognition and identification. This determined control signal A is then transmitted to personal assistant 250, thus controlling it accordingly. In particular, this ascertained control signal A may be selected in such a way that it corresponds to a control presumed to be desired by user 249. This presumed desired control may be ascertained as a function of the gesture recognized by artificial neural network 60. Control system 40 may then select control signal A for transmission to personal assistant 250 depending on the presumed desired control, and/or may select control signal A for transmission to the personal assistant 250 in accordance with presumed desired control.

For example, this corresponding control may include that personal assistant 250 retrieve information from a database and render it in a manner comprehensible for user 249.

Instead of personal assistant 250, a household appliance (not shown) may also be provided, particularly a washing machine, a range, a baking oven, a microwave or a dishwasher, in order to be controlled accordingly.

Figure 6:
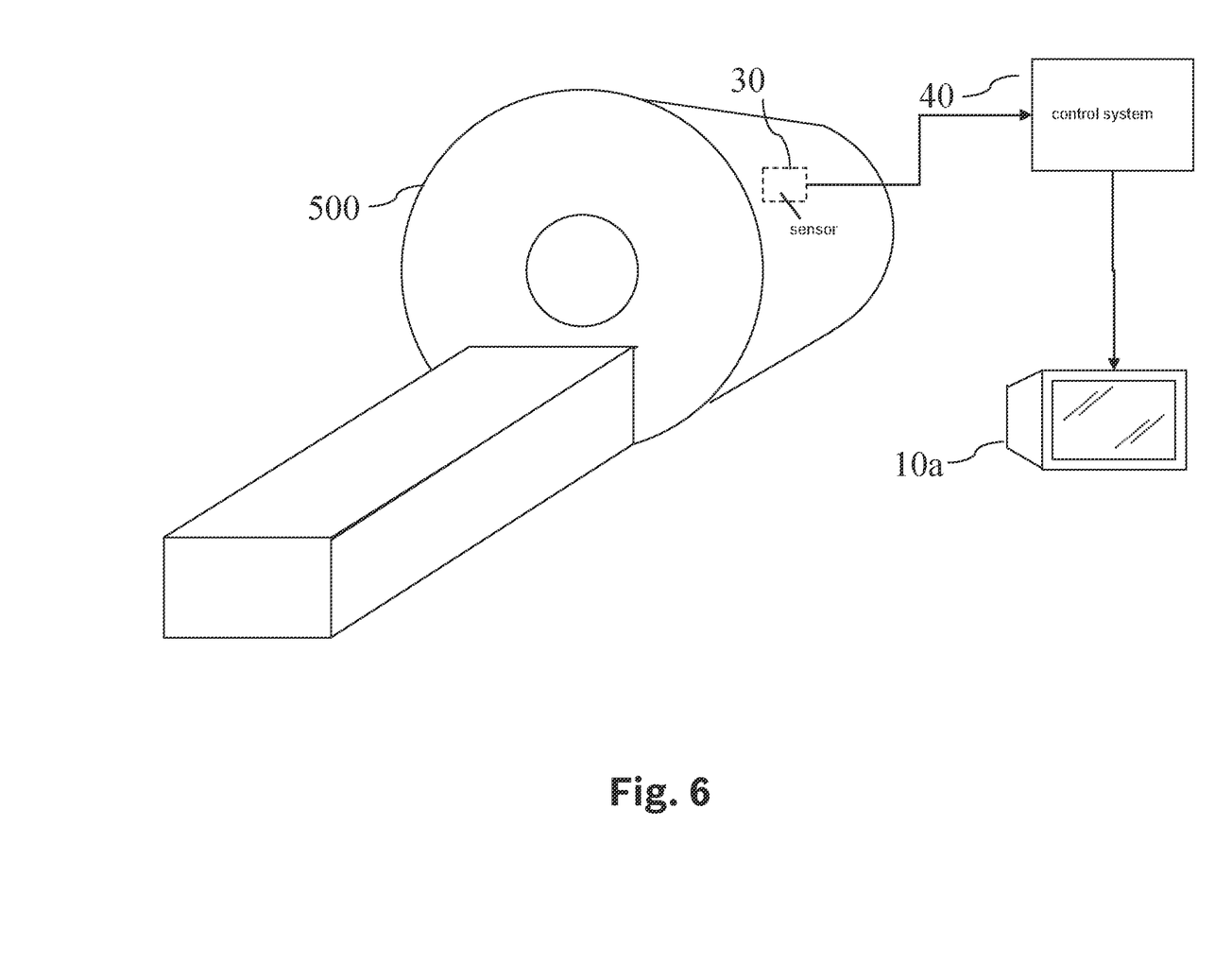
FIG. 6 shows schematically an exemplary embodiment for the control of a medical imaging system, in accordance with the present invention.

FIG. 6 shows an exemplary embodiment in which control system 40 is used to control a medical imaging system 500, e.g., an MRT machine, x-ray machine or ultrasonic device. For instance, sensor 30 may be provided by an imaging sensor; display unit 10a is controlled by control system 40. For example, neural network 60 may determine whether an area picked up by the imaging sensor is suspicious, and control signal A may then be selected in such a way that this area is displayed highlighted in terms of color by display unit 10a.

Figure 7:
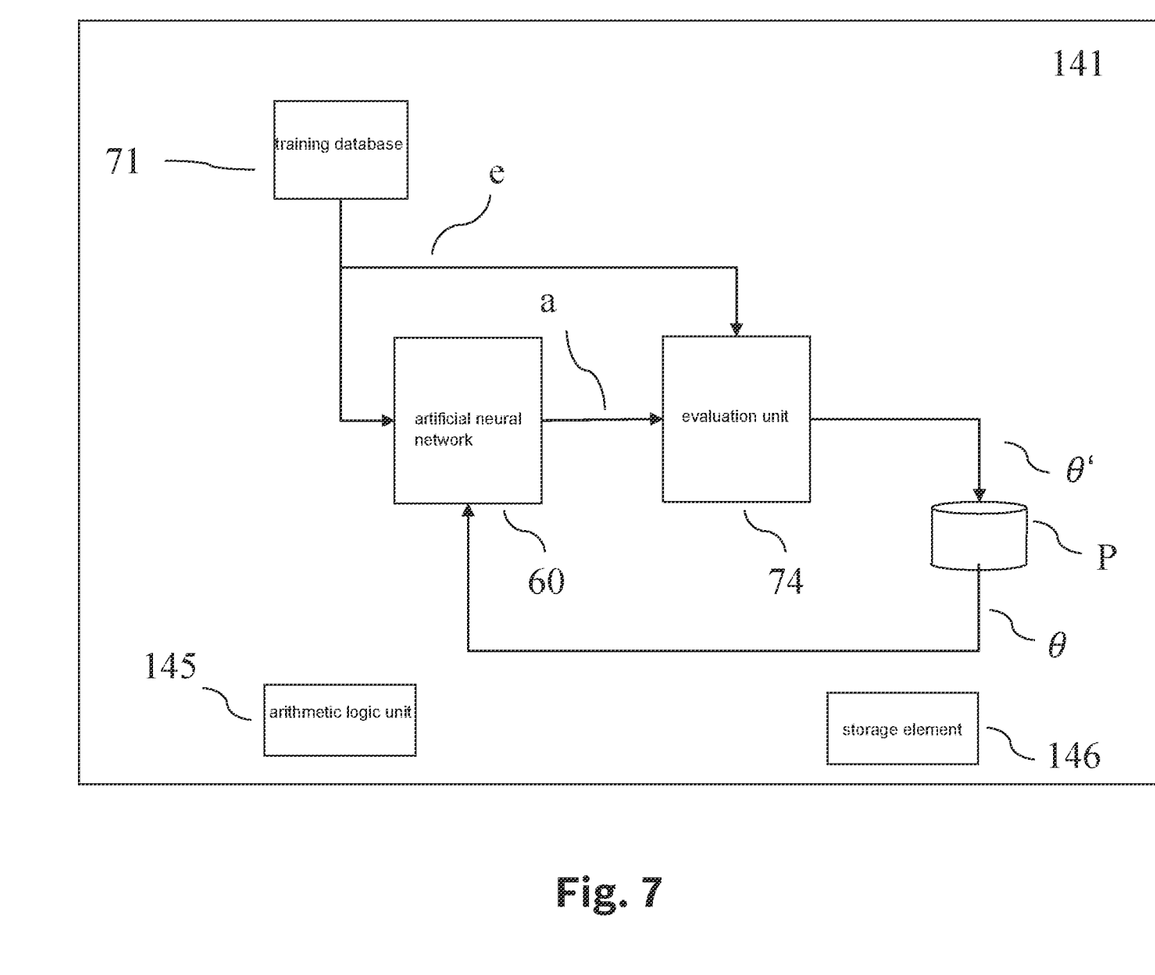
FIG. 7 shows a possible design of a training device, in accordance with an example embodiment of the present invention.

By way of example, FIG. 7 shows a training system 141 for training neural network 60. Training data are made available via a training database 71 to neural network 60, which determines an output quantity a and provides it to an evaluation unit 74. Evaluation unit 74 also receives label e and, with the aid of a machine learning algorithm and the hyperparameter configuration, preferably from step 18, determines adjusted parameters θ', which are stored in parameter memory P. Parameter memory P provides its parameters θ to neural network 60. Training system 141 also includes an arithmetic logic unit 145 and a storage element 146 on which a computer program is stored.

The term "computer" includes any devices for processing predefinable calculation instructions. These calculation instructions may exist in the form of software, or in the form of hardware, or in a mixed form of software and hardware.

What is claimed is:

1. A computer-implemented method for transfer learning of hyperparameters of a machine learning algorithm, comprising the following steps:
   i) providing a current search space, a previous search space, a loss function to be optimized, and a ranking of evaluated hyperparameter configurations of a previous optimization step utilizing the previous search space with respect to the loss function, the current and previous search spaces each being defined based on predetermined value ranges of the hyperparameters;
   ii) creating a reduced search space, value ranges of the hyperparameters of the reduced search space corresponding to the value ranges of the hyperparameters of the current search space, limited as a function of values of a predeterminable number of the best hyperparameter configurations from the ranking;
   iii) drawing candidate configurations repeatedly at random from the reduced search space and from the current search space, and utilizing the machine learning algorithm, parameterized in each case with the candidate configurations, to optimize the loss function;
   iv) creating a Tree Parzen Estimator (TPE) as a function of the candidate configuration and the results of the machine learning algorithm applied to the loss function to be optimized;
   v) multiple repeated drawing of further candidate configurations from the current search space using the TPE and applying the machine learning algorithm, parameterized in each instance with the candidate configurations, to the loss function;
   vi) creating a new ranking of the further candidate configurations and selecting one configuration from the new ranking as a hyperparameter configuration for the machine learning algorithm.

2. The method as recited in claim 1, wherein, in creating the reduced search space, the predeterminable number of the best hyperparameter configurations are selected from the ranking, and all values of the hyperparameters of the best hyperparameter configurations are determined, and a reduced search space is created based on the current search space, the value ranges of the hyperparameters being defined as a function of the minimum and maximum values of the individual hyperparameters of the predeterminable number of the best hyperparameter configurations.

3. The method as recited in claim 1, wherein an equal number of candidate configurations are drawn randomly from the reduced and from the current search space.

4. The method as recited in claim 1, wherein the step of the repeated random drawing of candidate configurations from the reduced and from the current search space is carried out at least two times a number of hyperparameters of the current search space.

5. The method as recited in claim 1, wherein only those value ranges which existed already in the previous search space and that value range of the current search space which was not changed compared to the preceding search space are reduced.

6. The method as recited in claim 1, wherein one of the hyperparameters is categorical, and in creating the reduced the search space, the value range of the categorical hyperparameter is set to the value of the category which was used for the best hyperparameter configurations.

7. The method as recited in claim 1, wherein the method with all its steps is carried out multiple times in succession, in doing so, the predeterminable number of the best hyperparameter configurations being reduced by a predefinable value with each implementation of the method.

8. The method as recited in claim 1, wherein the learning algorithm is created to train a machine learning system for computer vision, and the loss function characterizes a power of the machine learning system on a training data record for computer vision.

9. A device for transfer learning of hyperparameters of a machine learning algorithm, the device configured to:
   i) provide a current search space, a previous search space, a loss function to be optimized, and a ranking of evaluated hyperparameter configurations of a previous optimization step utilizing the previous search space with respect to the loss function, the current and previous search spaces each being defined based on predetermined value ranges of the hyperparameters;
   ii) create a reduced search space, value ranges of the hyperparameters of the reduced search space corresponding to the value ranges of the hyperparameters of the current search space, limited as a function of values of a predeterminable number of the best hyperparameter configurations from the ranking;
   iii) draw candidate configurations repeatedly at random from the reduced search space and from the current search space, and utilize the machine learning algorithm, parameterized in each case with the candidate configurations, to optimize the loss function;
   iv) create a Tree Parzen Estimator (TPE) as a function of the candidate configuration and results of the machine learning algorithm applied to the loss function to be optimized;
   v) multiple repeated drawing of further candidate configurations from the current search space using the TPE and applying the machine learning algorithm, parameterized in each instance with the candidate configurations, to the loss function;
   vi) create a new ranking of the further candidate configurations and selecting one configuration from the new ranking as a hyperparameter configuration for the machine learning algorithm.

10. A non-transitory machine-readable storage medium on which is stored a computer program for transfer learning of hyperparameters of a machine learning algorithm, the computer program, when executd by a computer, causing the computer to perform the following steps:
    i) providing a current search space, a previous search space, a loss function to be optimized, and a ranking of evaluated hyperparameter configurations of a previous optimization step utilizing the previous search space with respect to the loss function, the current and previous search spaces each being defined based on predetermined value ranges of the hyperparameters;

ii) creating a reduced search space, value ranges of the hyperparameters of the reduced search space corresponding to the value ranges of the hyperparameters of the current search space, limited as a function of values of a predeterminable number of the best hyperparameter configurations from the ranking;

iii) drawing candidate configurations repeatedly at random from the reduced search space and from the current search space, and utilizing the machine learning algorithm, parameterized in each case with the candidate configurations, to optimize the loss function;

iv) creating a Tree Parzen Estimator (TPE) as a function of the candidate configuration and the results of the machine learning algorithm applied to the loss function to be optimized;

v) multiple repeated drawing of further candidate configurations from the current search space using the TPE and applying the machine learning algorithm, parameterized in each instance with the candidate configurations, to the loss function;

vi) creating a new ranking of the further candidate configurations and selecting one configuration from the new ranking as a hyperparameter configuration for the machine learning algorithm.

* * * * *